INVENTORS
J.N. SCOTT, JR.
D.L. PETERS
BY
Hudson & Young
ATTORNEYS

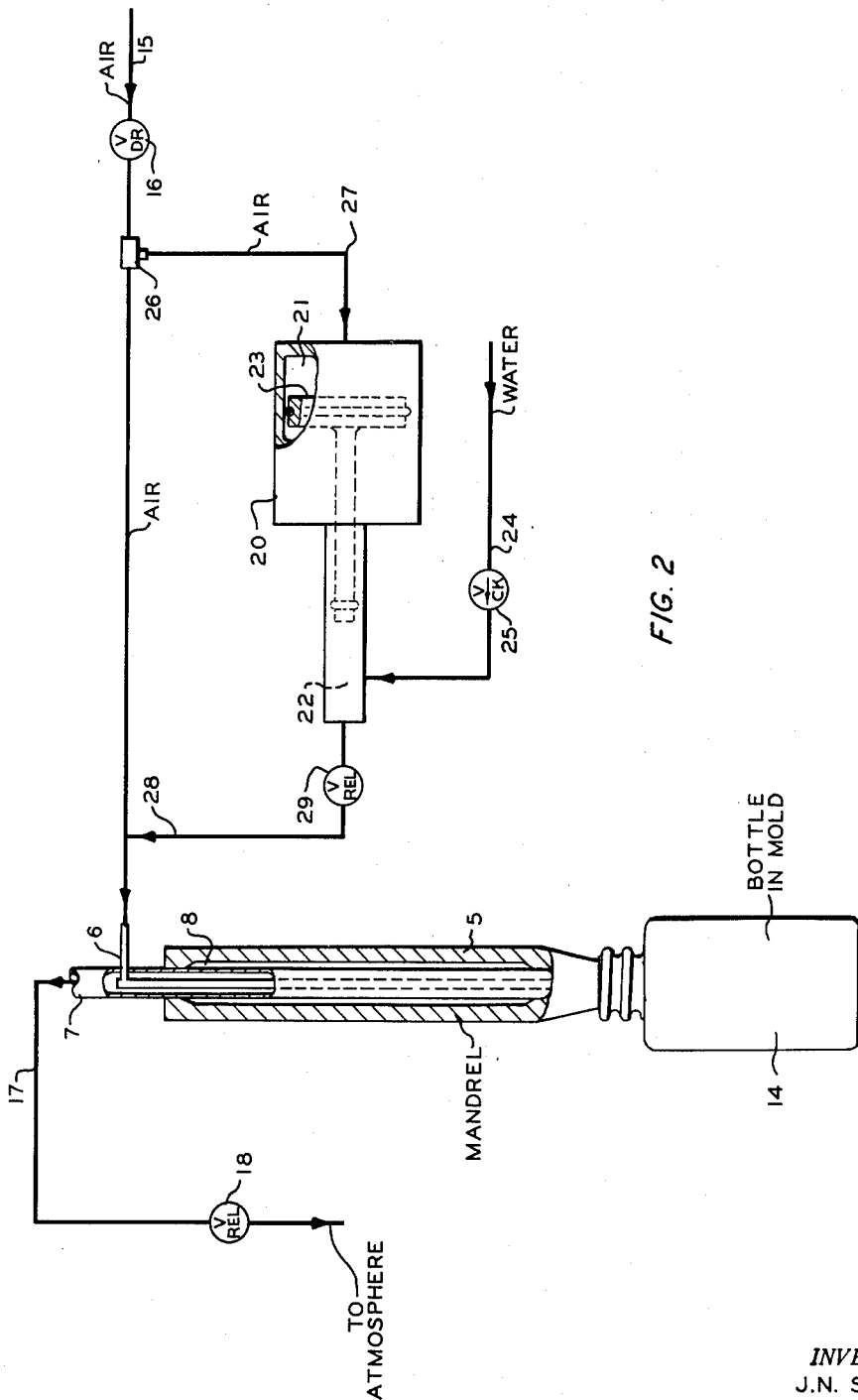

United States Patent Office 3,127,458
Patented Mar. 31, 1964

3,127,458
MOLDING
John N. Scott, Jr., and Donald L. Peters, Bartlesville, Okla., assignors to Phillips Petroleum Company, a corporation of Delaware
Filed Apr. 11, 1961, Ser. No. 102,243
6 Claims. (Cl. 264—98)

This invention relates to the molding of plastics. More specifically, it relates to methods and apparatus for blow molding a plastic material. In one of its aspects, this invention relates to circulating a coolant through a plastic containing mold. Another aspect relates to improving the removal of heat from the molding plastic resin by improving the conductivity and heat capacity of the coolant. In another of its aspects this invention relates to providing an atomized coolant into a plastic containing mold. Another aspect relates to providing an improved coolant containing an atomized component therein. Another of its aspects relates to the providing of a mandrel in a plastic molding apparatus which will allow the injection of atomized water and air into a mold. Still another aspect of this invention is to provide a mandrel which will allow air to be circulated through the mold after a pre-set pressure has been reached. Another aspect of this invention is to provide a mandrel which will allow an atomized coolant to be injected in the circulating air after a pre-determined pressure has been reached. A still further aspect to this invention is to provide a mandrel which will allow the blowing of air and atomized water through the molded object after a pre-set pressure is reached. Another aspect of this invention relates to the circulation of air to and from a mold, and apparatus to accomplish same. Another aspect relates to the providing of a mandrel having air or gas containing gap insulation in same. A further aspect relates to the providing of a mandrel having an air or gas gap insulation of the blowing channel through same. Another aspect relates to the providing of a mandrel having means for circulating air through same and communicating with molding means and further provided with means for inoculating said air with atomized water or coolant.

The process of forming articles, particularly blown hollow articles, such as bottles, from plastic materials, which are thermoplastic, hard at normal temperatures and rendered plastic and moldable under elevated temperatures and pressures, particularly organic plastic materials, such as:

polyethylene
polypropylene
other poly-1-olefins
copolymers
polystyrene
polyvinylchlorides etc., comprises first the bringing of the material to a plastic and moldable condition. For this purpose, when using most thermoplastic materials, the material in a comminuted form is subjected simultaneously to heat and pressure. In the present instance, the means shown for accomplishing this purpose is no part of the present invention, but can be any plasticating means, such as an extruder or injection molding machine, having a parison extrusion die directly communicating therewith. In addition, materials capable of wet extrusion may be employed in the process of this invention, since they can be dried to evaporate the solvent and cooled by the method as herein disclosed.

A commercially useful process to which the instant invention is applicable comprises rendering the plastic material molten by an injection molding machine. Such plastication is obtained by forcing the plastic material by a ram through a heated cylinder having a torpedo centered therein. The molten material is fed from the injection nozzle to the parison extrusion die and the parison (tubular form) is extruded from said die by the force exerted by said ram. When an extruder is used as the plasticating means, the force supplied by the extruder screw is utilized to extrude the parison from the die. When using an extruder, the continuous operation of same is maintained by use of at least two parison dies being fed alternately from the extruder. A less used method utilizes an extruder feeding molten plastic material to a reservoir chamber, wherein a piston intermittently forces material therefrom through a parison extrusion die.

The parison is extruded downward from the die, the mold closes around the parison, sealing together the lower end of the parison by clamping same together. The parison is expanded by positive pressure to the shape of the mold. After the article has taken shape and the mold is opened; the article is severed from the parent material at the die.

In carrying out the above process, the thermoplastic material is introduced for molding into a cooled mold and blown therein to shape the article, and thereafter the article is removed from the mold. Such method has been found to be slower than is desirable owing to the considerable length of time required for cooling the molten plastic. In attempting to overcome these difficulties various techniques have been employed in the past. For example, Hoffman, U.S. Patent 2,348,738 employs a cooling liquid which is circulated within the blown article by which it is quickly chilled and hardened, thus permitting the mold to be opened and the blown article to be removed without cooling the entire mold. Similarly, Haines, Reissue Patent No. 24,577 provides a sterile liquid to the hollow container immediately after the container is formed and while the container is hot so as to provide the requisite cooling.

We have now discovered that the production rates of blow mold items are increased by improving the efficiency of the cooling cycle by construction the blowing mandrel with an air inlet conduit and an air outlet conduit equipped with a variable pressure relief valve to allow the air to exhaust upon reaching a preset pressure which is sufficient to provide complete expansion of the parison. As another embodiment of our invention, we have discovered that the production rates are increased by the use of atomized water in the air to enhance the cooling effect. Also, we have found that by providing the blowing channel through the mandrel with an insulation formed by an air gap, there is eliminated undesirable heat build-up in the fluid medium and undesirable cooling of the mandrel and extrusion die.

Therefore, as one of the objects of the present invention there is provided an apparatus to improve the efficiency of the cooling cycle of blown molded items. Another object is to increase the production rates of blown molded items. A further object of the present invention is to provide a reduction in the required cooling time so as to yield an increase in the production rate of the desired items.

Other aspects, objects, and the several advantages of the invention are apparent from a study of this disclosure, the drawings and the appended claims.

Thus, according to this invention, there is provided a method and apparatus for use in the manufacture of blown hollow articles from organic plastic materials which are expansible by blowing and thereafter capable of being rigidified. Such a method and apparatus provide for the increased production rate of such plastic materials by reducing the in-mold cooling time ordinarily required in the extrusion of such materials.

FIGURE 2 is a sectional view of the special mandrel showing the air and water circulating means.

Figure 1:
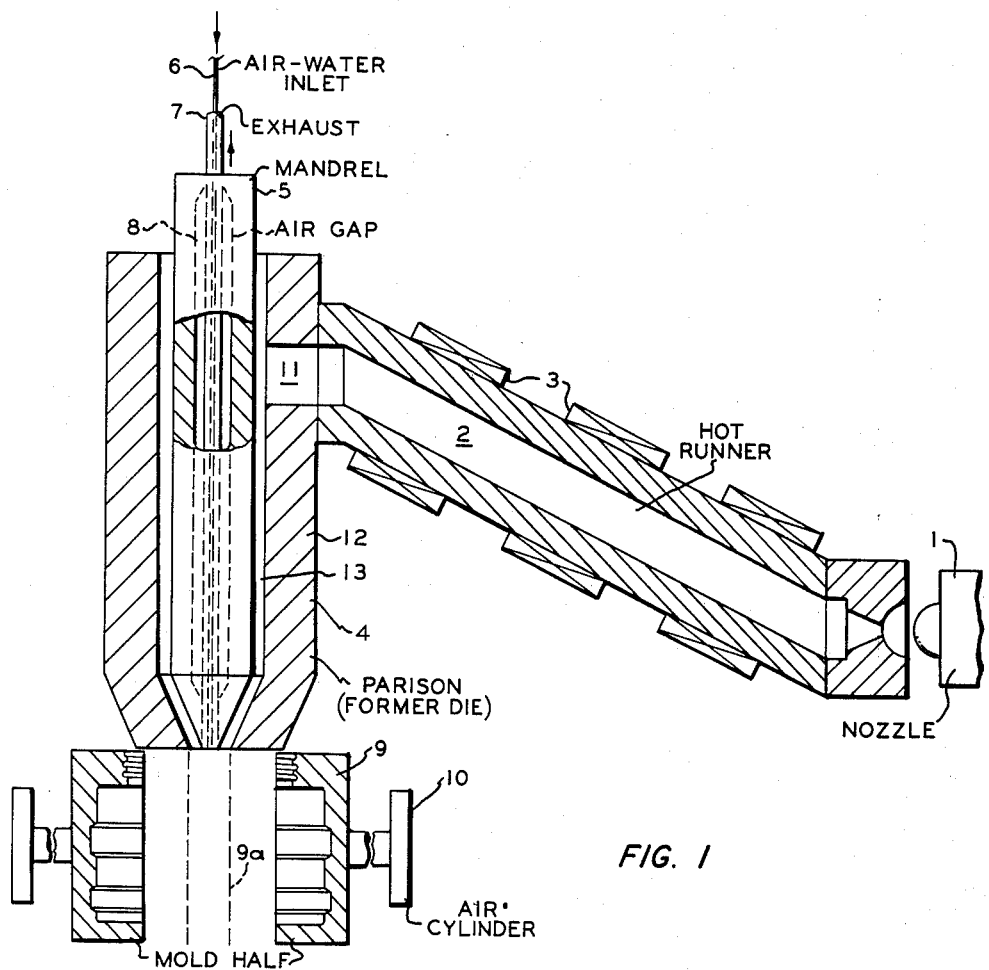
FIGURE 1 is a sectional view of a blow molding system utilizing the special mandrel.

Referring now to FIGURE 1, molten polymer is fed from a plasticating means, such as an extruder or injection molding machine, not shown, to nozzle 1 which communicates with hot runner 2 encircled by heater bands 3. Molten polymer is fed from the hot runner 2 to parison die 4 through conduit 11. The parison die comprises cylindrical housing member 12, having mandrel 5, disposed therein to form annular area 13. Conduit 7 is positioned vertically through mandrel 5. Conduit 6 is concentrically positioned in conduit 7. Mandrel 5 is recessed around conduit 7 to form air gap 8. Mold halves 9 operated by air cylinders 10 close around parison 9A extruded from annular area 13.

In FIGURE 2, mandrel 5 is shown in communication with bottle 14. Air from a source not shown travels through conduit 15 communicating with conduit 6. Directional valve 16 in conduit 15 regulates the flow of air in relation to the forming cycle. Air travels through conduits 15 and 6 into bottle 14 and then through conduits 7 and 17 to relief valve 18 which opens at a predetermined pressure to the atmosphere. Water injector mechanism 20 comprises chambers 21 and 22. Piston 23 is positioned in chambers 21 and 22. Water enters chamber 22 through check valve 25 and conduit 24. Air from conduit 15 enters chamber 21 through T 26 and conduit 27. Water is removed from chamber 22 via conduit 28 through relief valve 29 and travels through conduit 6, bottle 14 and exit conduit 7.

In operation, when the air supply is shut off water fills chamber 22 and pushes piston 23 farther into chamber 21. When the air is supplied and sufficient pressure is created on piston 23 to increase the pressure of the water in chamber 22 greater than that set on relief valve 29, relief valve 29 opens and allows the water to flow through the bottle as mist in the air. Check valve 25 prevents the water pressurized in chamber 22 from backing into conduit 24. Relief valve 29 is preset to open approximately simultaneously with the opening of relief valve 18.

In addition, high blow pressure may be utilized to rapidly force air into the parison without ever actually developing this pressure in the mold. Thus, the relief valve is set to exhaust at a relative pressure. The rapid blow is important to the obtaining of a good smooth surface.

Chamber 22 may be provided with a liquid volume adjustment means. This means comprises a rod that is adjustably inserted into water chamber 22 to control the volume of water in said chamber.

The following examples are given for purposes of illustration of the present invention and are not to be considered as limiting the present invention since variations therein are contemplated and would be expected.

EXAMPLE I

*Standard Molding Technique*

A four ounce capacity bottle weighing 20 grams with a wall thickness of 55 mils and a neck thickness of 95 mils was molded with a stock temperature of 430° F., a mold temperature of 80° F., and a blowing pressure of 60 p.s.i. To provide the necessary cooling, the pressure was held until the bottle had cooled to 235° F. in the neck section. This temperature was determined by the use of a neck temperature needle pyrometer. By the use of this standard technique with no air being circulated, a 15 second blowing time was required.

EXAMPLE II

*Standard Molding Technique*

A four ounce capacity bottle weighing 20 grams with a wall thickness of 55 mils and a neck thickness of 95 mils was molded with a stock temperature of 430° F., a mold temperature of 80° F. and a blowing pressure of 100 p.s.i. To provide the necessary cooling, the pressure was held until the bottle had cooled to 235° F. in the neck section. This temperature was determined by the use of a neck temperature needle pyrometer. By the use of this standard technique with no air being circulated, an 11 second blowing time was required.

EXAMPLE III

*Molding With Variable Pressure*

The same process as that of Example II is carried out but providing therein a relief valve on the mold pre-set at 60 p.s.i. so that 100 p.s.i. air is circulated through the mold so as to give an effective circulation with 40 p.s.i. head pressure. By using this circulating air there is achieved a cooling time of 9 seconds.

EXAMPLE IV

*Molding With Atomized Water*

The process of Example III was carried out but with the additional modification that 2.2 grams of water are atomized by the circulating air through the bottle. By using the combination of circulating air and water mist there is achieved a reduction in neck temperature to 180° F. for a cooling time of 6.5 seconds.

EXAMPLE V

The process of Example III is carried out with the additional modification that 2.1 grams of water are atomized by the circulating air and the neck temperature was reduced to 235° F. By this procedure the cooling time was reduced from the normal 11 seconds to 4 seconds.

EXAMPLE VI

A 90 mil wall thickness made using a stock temperature of 370° F. and mold temperature of tap water required 120 seconds for cooling with non-circulating air, 90 seconds for circulating air only, and 50 seconds for circulating water and air.

From the foregoing examples illustrating standard blowing techniques, wherein no air is circulated but only a predetermined pressure is maintained, it can be seen that a substantial change in pressure 60 to 100 p.s.i. resulted in only a 4 seconds time reduction.

TABLE I.—COMPARATIVE DATA OF BLOW MOLDING TECHNIQUES

| Example | Bottle Size, ounces | Stock Temp., °F. | Conditions | Water Vapors, grams $H_2O$ | Resulting Neck Temp., °F. | Cooling Time, seconds |
|---|---|---|---|---|---|---|
| 1 | 4 | 430 | 60 p.s.i. / No circulation | 0 | 235 | 15 |
| 2 | 4 | 430 | 100 p.s.i. / No circulation | 0 | 235 | 11 |
| 3 | 4 | 430 | 100 p.s.i. in / 60 p.s.i. out | 0 | 235 | 9 |
| 4 | 4 | 430 | 40 p.s.i. head / 100 p.s.i. in / 60 p.s.i. out | 2.2 | 180 | 6.5 |
| 5 | 4 | 430 | 100 p.s.i. in / 60 p.s.i. out | 2.1 | 235 | 4 |

TABLE II.—THE EFFECT OF WALL THICKNESS ON MINIMUM COOLING TIME

[The minimum cycle time is defined as the mold closed time necessary to cool the bottle neck to 235° F.]

| Wall Thickness, inches | Neck Thickness, inches | Bottle Weight, grams | Weight of Water Used, grams | Cooling Time | | Only Air Pressure |
|---|---|---|---|---|---|---|
| | | | | Air and Water, seconds | Air Circulation, seconds | |
| 0.018 | 0.040 | 9 | 1 | ½ | 1 | |
| 0.025 | 0.050 | 10½ | 1 | 1 | 2 | 2½ |
| 0.032 | 0.065 | 12 | 2 | 2 | 4 | 5 |
| 0.055 | 0.095 | 18½ | 3 | 4 | 7 | 9 |
| 0.070 | 0.125 | 23½ | 3 | 6 | 10 | 13 |

TABLE III.—THE EFFECT OF WATER QUANTITY ON COOLING TIME

A four ounce bottle having 0.060 inch wall thickness, 0.100 inch neck thickness to be cooled to 235° F. required:

Coolant:                              Time, sec. cycle
- No air circulating _____ 11
- Air circulating _____ 9
- 0.6 gm. water/bottle _____ 6
- 1.5 gm. water/bottle _____ 5
- 2.1 gm. water/bottle _____ 4
- 3.2 gm. water/bottle _____ [1] 3

[1] The surface of the bottle showed pock marks.

From the foregoing examples and tables, it is shown that by the present invention there is achieved a reduction in the time required in the cooling cycle required thus giving a more efficient system which will allow for increased production rates of the blow molded item. There is provided an 18 percent reduction in cooling time by the utilization of circulated air alone. By the combination of circulated air and water vapor there is achieved a more than 60 percent reduction in cooling time.

The polymer used in the foregoing examples is an ethylene-butene-1 copolymer prepared using a chromium oxide-containing catalyst in which part of the chromium was in the hexavalent state. The catalyst contained 2.5 weight percent chromium. The polymerization was carried out in the presence of cyclohexane solvent and the monomer feed contained 5 percent butene-1. The polymer thus produced was an ethylene-butene copolymer containing about 2½ percent butene-1. This polymer has a density of 0.950 measured by ASTM D 1505–57T. A melt index of 0.3 measured by ASTM D 1238-57T. A softening temperature of 255° F. measured by ASTM D 1525–58T.

While the foregoing examples have been limited for purposes of illustration to bottles of similar composition and particular pressures have been employed, it will be obvious to one skilled in the art that variations of bottle size, composition, temperatures, pressures and water and others can be varied depending on the operating conditions desired. Likewise, the process herein is applicable to the production of other types of blow molded products. Thus, in addition to bottles, other hollow extruded products such as pipe and blown tubing can be made at higher rates by using the internal cooling technique. This, of course, would be a continuous circulation of atomized water and air and would require only a calibrated valve instead of the metering device as used for blow molding.

In addition to achieving cooling as shown, additional cooling may be obtained by a pre-cooling of the parison. This can be accomplished by continuously introducing air and/or water through the parison as it is being extruded. Thus the parison becomes slightly cooled before blowing and therefore requires a shorter cooling cycle in the mold.

The cooling liquid can be any liquid generally boiling between 100° F. and 225° F, such as water, carbon tetrachloride, chloroform, liquid gas, Freon, and dioxane, the preferred liquid being water. Liquids which are flammable, hazardous, and detrimental to the polymer are operable but require great care in use and means for collecting the exhaust gases. In addition, the expanding medium may be an oxidizing gas or a mixture of air and an oxidizing gas that will treat the surface and make it polar during the blowing and forming step. Such treatment allows for the surfaces to be coated with additional material to impart impermeability to the bottle for increased utility in packaging different materials. Gases which are capable of treating the surface of polyethylene are chlorine, nitrous oxide, ozone, oxygen, etc. Also, the cooling liquid may be a cross linking agent such as benzoyl peroxide, dicumyl peroxide, etc., which would thus cut down on the swelling tendencies of the object prepared in accordance with this process.

As a variation in the introduction and exhaust of the blowing and cooling medium, when using the molding technique where the parison is extruded downward over a mandrel, the fluid medium conduits can be positioned in this mandrel rather than within the die. This technique has the advantage that insulation is not required between the fluid conduits and the mandrel. Also, when using a needle blowing technique, an exhaust needle can be used to accomplish the object of this invention.

Reasonable variation and modification are possible within the scope of the foregoing disclosure, drawings and appended claims to the invention, the essence of which is that there have been provided method and apparatus for extruding a body of plastic material into the cavity of a mold, blowing the extruded portion of plastic material into conformity with the confines of mold, cooling the blow material by injecting coolant into same and subsequently removing the rigidified article from said mold.

We claim:

1. A process for the manufacture of blown hollow articles from organic plastic materials which are expandible by blowing and thereafter are capable of being rigidified which comprises extruding a portion of plastic material, blowing the extruded portion of plastic material into conformity with the confines of an enclosing mold, cooling said plastic material by first introducing substantially dry air under pressure, circulating under pressure the air within said blown hollow article, and thereafter introducing into said circulating air under pressure a small amount of an atomized liquid coolant to achieve circulation of said liquid coolant with said air.

2. The process of claim 1 wherein said atomized liquid coolant is water.

3. A process for the manufacture of blown hollow articles from organic plastic materials which are expandible by blowing and thereafter are capable of being rigidified which comprises extruding a body of plastic material in a molding zone, blowing said extruded body of plastic material into conformity with the confines of said molding zone with a substantially dry gaseous blowing medium, thereafter introducing into said blowing medium an atomized liquid coolant, and cooling said plastic material by allowing said gaseous blowing medium and said atomized liquid coolant to circulate within the blown plastic article while maintaining pressure within said blown hollow article.

4. The process of claim 3 wherein said atomized liquid coolant is water.

5. The process of claim 4 wherein circulation is achieved by the differential pressure established by introducing said blowing medium and said atomized coolant at a higher pressure than the exhaust pressure.

6. A process for forming a blown hollow article from an organic thermoplastic material which is expandible by blowing and thereafter is capable of being rigidified which comprises introducing said thermoplastic material into a mold, blowing said material into conformity with said mold by introducing a substantially dry gaseous blowing medium under pressure into same, continuing to blow said material with a gaseous blowing medium having an atomized liquid coolant in same, cooling the resulting blown article by allowing the blowing medium and atomized liquid coolant to circulate into and out of the article under pressure, and subsequently removing the cooled blown hollow article from said mold.

References Cited in the file of this patent

UNITED STATES PATENTS

| | | |
|---|---|---|
| 2,160,182 | Vrooman | May 30, 1939 |
| 2,290,129 | Moreland et al. | July 14, 1942 |
| 2,298,716 | Moreland et al. | Oct. 13, 1942 |
| 2,348,738 | Hofmann | May 16, 1944 |
| 2,750,625 | Colombo | June 19, 1956 |
| 2,792,593 | Hardgrove | May 21, 1957 |
| 2,890,485 | Knowles | June 16, 1959 |
| 2,899,709 | Steiner | Aug. 18, 1959 |
| 2,903,740 | Parfrey | Sept. 15, 1959 |
| 2,935,764 | Mason | May 10, 1960 |

FOREIGN PATENTS

| | | |
|---|---|---|
| 1,208,633 | France | Feb. 24, 1960 |